United States Patent
Schlesak et al.

(10) Patent No.: US 9,144,875 B2
(45) Date of Patent: Sep. 29, 2015

(54) HANDHELD POWER TOOL DEVICE

(75) Inventors: Gerd Schlesak, Tamm (DE); Christoph Klee, Nuertingen (DE); Juergen Lennartz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 145 days.

(21) Appl. No.: 12/948,434

(22) Filed: Nov. 17, 2010

(65) Prior Publication Data

US 2011/0114345 A1    May 19, 2011

(30) Foreign Application Priority Data

Nov. 17, 2009  (DE) .......................... 10 2009 046 789

(51) Int. Cl.
| | | |
|---|---|---|
| *E21B 15/04* | (2006.01) | |
| *B23Q 17/22* | (2006.01) | |
| *B23Q 11/00* | (2006.01) | |
| *B25D 17/00* | (2006.01) | |
| *B25F 5/02* | (2006.01) | |

(52) U.S. Cl.
CPC ............ *B23Q 17/22* (2013.01); *B23Q 11/0092* (2013.01); *B25D 17/00* (2013.01); *B25F 5/024* (2013.01); *B25D 2250/221* (2013.01)

(58) Field of Classification Search
CPC ............ B25B 1/00; B25F 5/00; B25F 5/001; B25D 17/00; B25D 16/00; B25D 2216/0069; B25D 2250/221; B23Q 17/2233; B23Q 17/2428
USPC ........... 173/18, 2, 29, 176, 180–181; 340/680
See application file for complete search history.

(56) References Cited

U.S. PATENT DOCUMENTS

| | | | | |
|---|---|---|---|---|
| 4,063,600 | A | * | 12/1977 | Krzes ............................. 173/176 |
| 4,066,133 | A | * | 1/1978 | Voss .............................. 173/182 |
| 4,638,870 | A | | 1/1987 | Kousek |
| 5,372,054 | A | * | 12/1994 | Federighi, Sr. ................ 81/3.09 |
| 5,401,124 | A | * | 3/1995 | Hettich ............................. 408/6 |
| 5,563,482 | A | * | 10/1996 | Shaw et al. ................... 318/272 |
| 5,583,386 | A | * | 12/1996 | Meixner et al. .............. 307/326 |
| 5,879,111 | A | * | 3/1999 | Stock et al. ....................... 408/6 |
| 5,903,462 | A | * | 5/1999 | Wagner et al. ................ 700/168 |
| 5,914,882 | A | * | 6/1999 | Yeghiazarians ............... 700/177 |
| 5,954,457 | A | * | 9/1999 | Stock et al. ....................... 408/6 |
| 6,109,370 | A | * | 8/2000 | Gray ................................ 175/61 |
| 6,111,515 | A | * | 8/2000 | Schaer et al. ................. 340/680 |
| 6,123,241 | A | * | 9/2000 | Walter et al. ..................... 227/8 |
| 6,213,370 | B1 | * | 4/2001 | Walter ............................... 227/8 |
| 6,223,963 | B1 | * | 5/2001 | Aparacio, Jr. .................... 227/8 |
| 6,247,626 | B1 | * | 6/2001 | MacVicar ....................... 227/10 |
| 6,257,077 | B1 | * | 7/2001 | Patterson .................... 73/865.9 |
| 6,331,744 | B1 | * | 12/2001 | Chen et al. .................... 310/171 |

(Continued)

FOREIGN PATENT DOCUMENTS

| | | |
|---|---|---|
| CN | 1321568 A | 11/2001 |
| CN | 1491973 A | 4/2004 |

(Continued)

*Primary Examiner* — Robert Long
(74) *Attorney, Agent, or Firm* — Maginot, Moore & Beck LLP

(57) ABSTRACT

The invention is based on a handheld power tool device, having at least one safety mechanism, which intervenes in an uncontrolled blocking situation, and which has a sensor unit. It is proposed that the sensor unit is provided for directly detecting at least one orientation parameter of a handheld power tool.

15 Claims, 3 Drawing Sheets

(56) References Cited

U.S. PATENT DOCUMENTS

| | | | |
|---|---|---|---|
| 6,341,533 B1* | 1/2002 | Schoeps | 73/862.23 |
| 6,536,536 B1* | 3/2003 | Gass et al. | 173/2 |
| 6,700,341 B2* | 3/2004 | Schaer et al. | 318/432 |
| 6,843,327 B2* | 1/2005 | Meixner et al. | 173/11 |
| 6,981,557 B2* | 1/2006 | Boeni et al. | 173/1 |
| 7,036,703 B2* | 5/2006 | Grazioli et al. | 227/10 |
| 7,055,620 B2* | 6/2006 | Nadig et al. | 173/2 |
| 7,350,286 B2* | 4/2008 | Asano et al. | 29/700 |
| 7,395,871 B2* | 7/2008 | Carrier et al. | 173/1 |
| 7,497,272 B2* | 3/2009 | Strasser et al. | 173/48 |
| 7,552,781 B2* | 6/2009 | Zhang et al. | 173/176 |
| 7,628,219 B2* | 12/2009 | Frauhammer et al. | 173/18 |
| 7,681,659 B2* | 3/2010 | Zhang et al. | 173/1 |
| 7,730,963 B2* | 6/2010 | Carrier et al. | 173/2 |
| 7,752,763 B2* | 7/2010 | Yamamoto | 33/334 |
| 7,938,194 B2* | 5/2011 | Carrier et al. | 173/2 |
| 8,235,136 B2* | 8/2012 | Berger et al. | 173/2 |
| 8,261,642 B2* | 9/2012 | Brandstrom et al. | 81/469 |
| 8,622,271 B2* | 1/2014 | Shima et al. | 227/2 |
| 2001/0045785 A1* | 11/2001 | Chen et al. | 310/104 |
| 2002/0145724 A1* | 10/2002 | Wursch et al. | 356/4.01 |
| 2003/0006051 A1* | 1/2003 | Schmitzer et al. | 173/49 |
| 2003/0030342 A1* | 2/2003 | Chen et al. | 310/102 R |
| 2003/0116333 A1* | 6/2003 | Voulkidis et al. | 173/104 |
| 2004/0211573 A1* | 10/2004 | Carrier et al. | 173/2 |
| 2005/0161241 A1* | 7/2005 | Frauhammer et al. | 173/1 |
| 2006/0037766 A1* | 2/2006 | Gass et al. | 173/20 |
| 2008/0017689 A1* | 1/2008 | Simonelli et al. | 227/132 |
| 2008/0163504 A1* | 7/2008 | Smith et al. | 33/268 |
| 2008/0196912 A1* | 8/2008 | Gass et al. | 173/4 |
| 2008/0319570 A1* | 12/2008 | Van Schoiack | 700/110 |
| 2009/0236387 A1* | 9/2009 | Simonelli et al. | 227/8 |
| 2010/0282482 A1* | 11/2010 | Austin et al. | 173/2 |
| 2011/0088921 A1* | 4/2011 | Forgues et al. | 173/1 |
| 2011/0315414 A1* | 12/2011 | Kuntner et al. | 173/1 |
| 2012/0116415 A1* | 5/2012 | Forsell | 606/119 |
| 2014/0216773 A1* | 8/2014 | Steurer | 173/1 |

FOREIGN PATENT DOCUMENTS

| | | |
|---|---|---|
| DE | 10 2008 054 455 A1 | 6/2010 |
| GB | 2400811 A | 10/2004 |
| GB | 2410205 A | 7/2005 |

* cited by examiner

HANDHELD POWER TOOL DEVICE

CROSS-REFERENCE TO RELATED APPLICATION

This application is based on German Patent Application 10 2009 046 789.0 filed on Nov. 17, 2009.

BACKGROUND OF THE INVENTION

1. Field of the Invention

The invention is based on a handheld power tool device.

2. Description of the Prior Art

From German Patent Disclosure DE 100 41 632 A1, a handheld power tool device with at least one safety mechanism, which intervenes in an uncontrolled blocking situation and which has a sensor unit, has already been proposed.

SUMMARY OF THE INVENTION

The invention is based on a handheld power tool device with at least one safety mechanism, which intervenes in an uncontrolled blocking situation and which has a sensor unit.

It is proposed that the sensor unit is provided for directly detecting at least one orientation parameter. The term "safety mechanism" should be understood in particular to mean a device which in at least one operating state prevents damage, particularly to a part of the handheld power tool, and/or in particular enhances safety for a user. The term "uncontrolled blocking situation" should be understood in particular to mean a process in which a tool insert seizes in a workpiece that is to be machined, and the reaction torque exerted on the housing exceeds a holding force of the user, and the housing rotates uncontrollably over a defined angular range about an axis, in particular an axis of rotation of a tool insert fastener. The term "intervene" should be understood in particular to mean that the safety mechanism, in an uncontrolled blocking situation, takes measures which enhance safety, such as in particular the measure of shutting off a drive motor. The term "sensor unit" should be understood in particular to mean a sensor unit appearing useful to one skilled in the art, in particular one that measures a magnetic field and/or some other field, such as a fluxgate magnetometer unit, a gravity sensor unit, and/or in particular a Hall sensor unit. The term "provided" should be understood in particular to mean especially equipped, designed, and/or programmed. The term "orientation parameter" should be understood in particular to mean a parameter which is variously pronounced at different orientations of the handheld power tool, in particular at different orientations of the handheld power tool about an axis of rotation of a tool insert fastener, preferably even when the handheld power tool is not in motion. Preferably, the at least one orientation parameter is at least one component of a field that can be described by a vector. The term "detects" should be understood in particular to mean that in a measurement operation, the sensor unit measures the orientation parameter and converts its value into an electrical sensor parameter. The term "sensor parameter" should be understood in particular to mean a parameter which describes at least the orientation parameter. Advantageously, the sensor unit transmits the sensor parameter in digital form. Especially advantageously, the sensor unit transmits two or three sensor parameters serially in digital form. Alternatively or in addition, the sensor unit could transmit two or three sensor parameters in parallel and/or in particular in analog fashion. The phrase "directly detect" should be understood in particular to mean that the sensor unit is provided for measuring an orientation parameter that is directly dependent on an orientation of the handheld power tool; that is, in particular, the orientation need not be calculated by integration. In addition to the aforementioned directly detecting sensor unit, the safety mechanism could have an acceleration sensor, which detects the orientation indirectly and detects an acceleration about an axis of rotation of a tool insert fastener. As a result of the embodiment according to the invention of the handheld power tool device, especially great safety can be attained, particularly even in the presence of heavy vibration and in the event of a slow rotation of the handheld power tool, which causes a slight acceleration.

In a further feature, it is proposed that in at least one operating state, the sensor unit detects an orientation parameter of the Earth's magnetic field, and as a result, in a convenient and structurally simple way, an orientation can be determined especially advantageously. The term "Earth's magnetic field" should be understood in particular to mean a magnetic field generated by kinetic energy of the core of the Earth. Alternatively or advantageously in addition, the handheld power tool device could have a sensor unit which in at least one operating state detects at least one orientation parameter of the field of gravity of the Earth, as a result of which great safety can be achieved especially reliably.

It is furthermore proposed that the sensor unit is provided for detecting at least two different orientation parameters, which describe an orientation, and as a result, especially precise detection of the orientation, in a manner that sturdily withstands interference, is possible. The term "different orientation parameters" should be understood in particular to mean different components of the field that can be described by a vector. Preferably, the sensor unit detects three different orientation parameters. Also preferably, the sensor unit detects different orientation parameters, whose components of the vector are oriented essentially perpendicular to one another; in particular, "essentially" means with a deviation of less than 30° and advantageously less than 10°. Advantageously, the orientation parameter describes an orientation of at least the handheld power tool relative to the Earth's magnetic field.

It is also proposed that the safety mechanism has a computation unit, which is provided for comparing at least two orientation parameters measured at staggered times. The term "computation unit" should be understood in particular to mean a unit with an information input, information processing, and an information output. Advantageously, the computation unit has at least one processor, a memory, a communication device, optionally further electrical components, an operating program, and/or calculation routines, which are disposed all on the same board, divided up into a plurality of structural groups, and/or advantageously disposed in a common housing. Preferably, the computation unit calculates a value from the two orientation parameters measured at staggered times and advantageously, in particular by differentiation, it calculates the speed of a change in orientation. The term "measured orientation parameter" should be understood in particular to mean a sensor parameter, that is, an output variable of the sensor unit. As a result of the comparison made by the computation unit, great safety in various work situations can be conveniently achieved; in particular, even a slow rotation, and especially advantageously an incremental rotation, can be securely detected.

It is furthermore proposed that the safety mechanism has a computation unit which is provided for comparing a change in orientation with a shutoff threshold value, as a result of which especially great safety can be achieved. The term "change in orientation" should be understood in particular to mean a piece of information which results from a comparison of two measured orientation parameters. Advantageously, the shutoff threshold value is adjustable by a user. Preferably, a single computation unit compares the measured orientation parameters with one another and compares the resultant change in orientation with the shutoff threshold value. Alternatively, two spatially separated computation units could perform the two different comparisons.

It is also proposed that the sensor unit is spaced apart from components which essentially influence detection of the Earth's magnetic field; as a result, interfering factors on detecting the Earth's magnetic field can be reduced, and thus especially reliable detection of the orientation can be achieved. The term "a component essentially influencing detection of the Earth's magnetic field" should be understood in particular to mean a component which, by superimposing interference fields on the Earth's magnetic field, varies at least one orientation parameter, measured by the sensor unit at a spacing of more than 1 cm from the component, of the Earth's magnetic field by more than 10%, and in particular by more than 25%. The term "spaced apart" should be understood in this connection to mean in particular that each point of the sensor unit is at a distance of at least 0.5 cm, advantageously at least 2 cm, and especially advantageously at least 5 cm from each point of the component. Preferably, the sensor unit is spaced apart by at least 1 cm, advantageously at least 3 cm, and especially advantageously at least 10 cm, from components of the handheld power tool which perform electrical driving work in at least one operating state.

In an advantageous embodiment of the invention, it is proposed that the handheld power tool device has an additional handle, in which the sensor unit is disposed. In particular, the term "additional handle" should be understood to mean a handle which is connected to the housing on one side of the housing of the handheld power tool and is oriented toward a tool insert fastener of the handheld power tool; that is, in particular it is oriented downstream of a main handle in terms of the main working direction. Preferably, the additional handle is spaced apart from a rechargeable battery of the handheld power tool and/or from a power connection of the handheld power tool by at least 5 cm and advantageously at least 10 cm. Advantageously, the additional handle can be retrofitted onto the handheld power tool. Because of the disposition of the sensor unit in the additional handle, the sensor unit can advantageously be located far away from sources of interference that influence the Earth's magnetic field, and as a result it can operate especially reliably. It is also proposed that influence on a measurement of the Earth's magnetic field be reduced by means of lubrication with suitable materials, by twisting opposite current-carrying cords, and/or by other measures that appear useful to one skilled in the art.

In a further feature, it is proposed that the safety mechanism has a transmission, which in at least one operating state transmits a sensor parameter in wireless fashion, as a result of which in a structurally simple way, an advantageous disposition of the sensor unit is possible, in particular in the additional handle and without conductive contacts being located on the outside. The phrase "transmit in wireless fashion" should be understood in particular to mean that the transmission outputs a signal containing information about the sensor parameter over an electrically nonconductive distance, in particular to a receiver of the handheld power tool. Preferably, the transmission transmits the sensor parameter by means of a radio signal. Alternatively or in addition, the transmission could transmit the sensor parameter by means of an inductive signal, an ultrasonic signal, an infrared signal, and/or some other signal appearing useful to one skilled in the art.

It is furthermore proposed that the safety mechanism has an energy receiving device, which is provided for receiving operating energy transmitted in wireless fashion. The term "energy receiving device" should be understood in particular to mean a coil and/or some other means that appears useful to one skilled in the art. The term "operating energy" should be understood in particular to mean energy for supplying the sensor unit and/or in particular the transmission. Because of the energy receiving device, it is advantageously possible to dispense with energy transmission by wire, such as telephone landlines, and in particular to dispense with external contacts on the additional handle; as a result, great safety and high reliability can be achieved.

It is also proposed that the energy receiving device, in at least one operating state, receives energy output at least by a drive motor, as a result of which a separate energy-emitting device can advantageously be dispensed with. As a result, engineering effort and expense can be avoided and fewer structural parts are needed. The phrase "energy output by a drive motor" should be understood in particular to mean some of the energy of a magnetic field that rotates a rotor of the drive motor. This technique, known to one skilled in the art as "energy harvesting" collects electromagnetic energy, which in this case originates mainly in the drive motor, and makes it available as operating energy to an energy consumer.

The invention is also based on a handheld power tool with a handheld power tool device; all handheld power tools that appear useful to one skilled in the art, such as rotary hammers, screwdrivers, milling cutters, angle sanders, multifunction tools, and/or in particular power drills, would be conceivable for operation with a handheld power tool device, and as a result an especially safely usable handheld power tool can be furnished. Moreover, the handheld power tool and the handheld power tool device can advantageously be adapted to one another.

The invention is furthermore based on a method for operating a handheld power tool device, in which at least one safety mechanism intervenes in an uncontrolled blocking situation.

It is proposed that for detecting an uncontrolled blocking situation, a sensor unit of the safety mechanism detects an orientation parameter directly, and as a result, especially great safety can be achieved, particularly even in the presence of heavy vibration and in the event of a slow rotation of the handheld power tool, which causes a slight acceleration.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
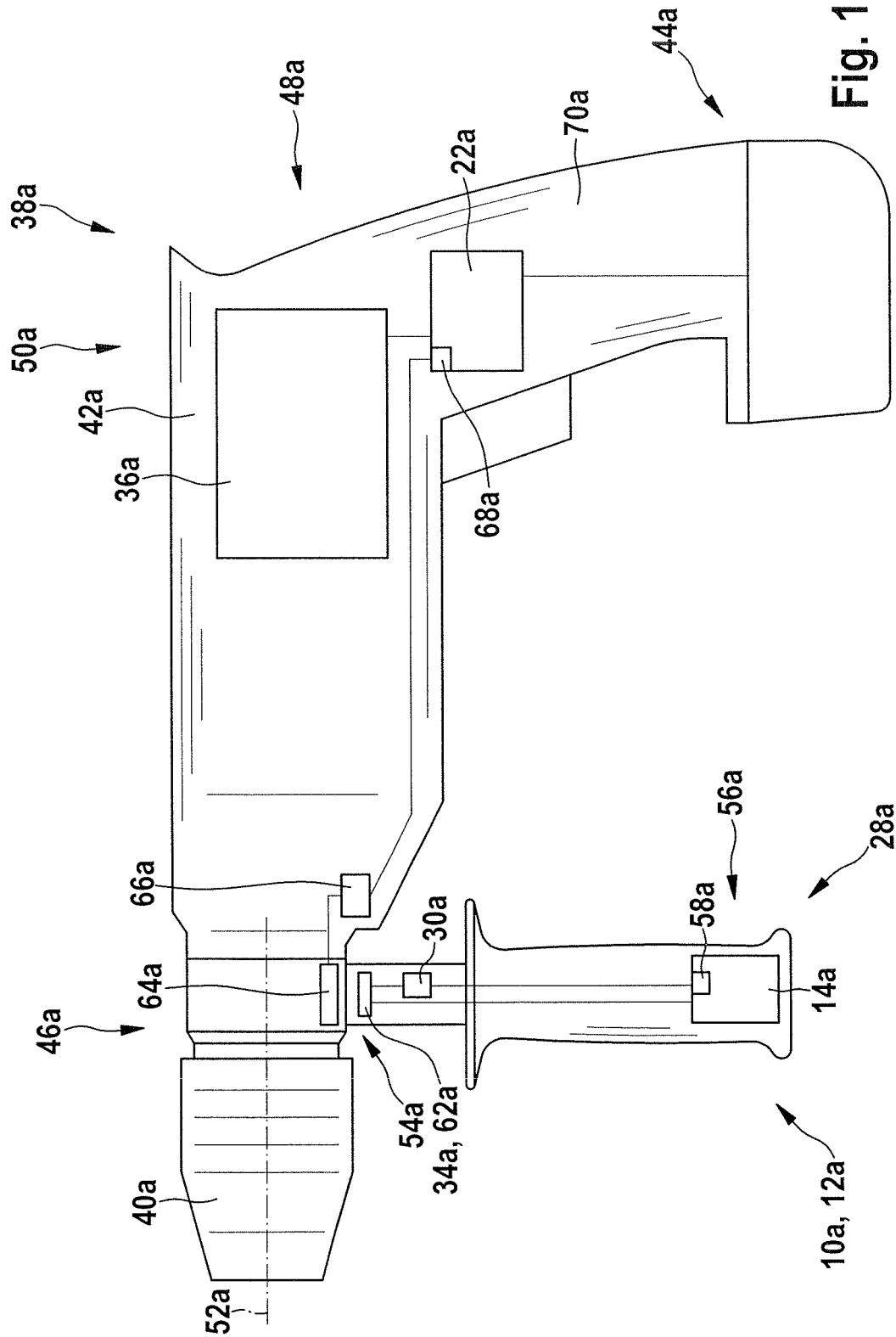
FIG. 1 schematically shows a handheld power tool having a handheld power tool device according to the invention.

FIG. 1 shows a handheld power tool 38a, which has a handheld power tool device 10a that is in accordance with the invention. The handheld power tool 38a is embodied as a cordless impact hammer/impact drill. It has a drive motor 36a, a tool insert fastener 40a, a pistol-shaped housing 42a, and a battery interface 44a. The tool insert fastener 40a is disposed on a front side 46a of an upper, essentially tubular region 48a of the housing 42a. The drive motor 36a is disposed in the housing 42a on a back side 50a of the upper region 48a of the housing 42a. All the electrical cords of the handheld power tool 38a that carry operating power are embodied in twisted form.

During an operation, the drive motor 36a drives the tool insert fastener 40a to rotate about an axis of rotation 52a. The handheld power tool 38a has an additional handle fastener 54a, which fastens an additional handle 28a movably about the axis of rotation 52a. The additional handle fastener 54a is disposed on the outside of the housing 42a, between the drive motor 36a and the tool insert fastener 40a. The battery interface 44a is disposed on an end of the housing 42a that is oriented away from the tool insert fastener 40a.

The handheld power tool device 10a has a safety mechanism 12a, a sensor unit 14a, a computation unit 22a, and the additional handle 28a. In an uncontrolled blocking situation, the safety mechanism 12a intervenes and interrupts a power emission from the tool insert fastener 40a by switching the drive motor 36a to be currentless, or in other words shuts the drive motor off. The sensor unit 14a is disposed in the additional handle 28a, specifically on an end 56a of the additional handle 28a that in an installed state is remote from the additional handle fastener 54a. Thus the sensor unit 14a is spaced apart from components which influence a measurement of the Earth's magnetic field 20a, such as the drive motor 36a, the tool insert fastener 40a, and a gear, not shown, of the handheld power tool 38a. The sensor unit 14a has two Hall sensors, not identified by reference numeral, which during an operation, to detect an uncontrolled blocking situation, directly detect two orientation parameters 16a, 18a, by jointly detecting a parameter of a quantity of the Earth's magnetic field 20a perpendicular to the axis of rotation 52a.

Figure 2:
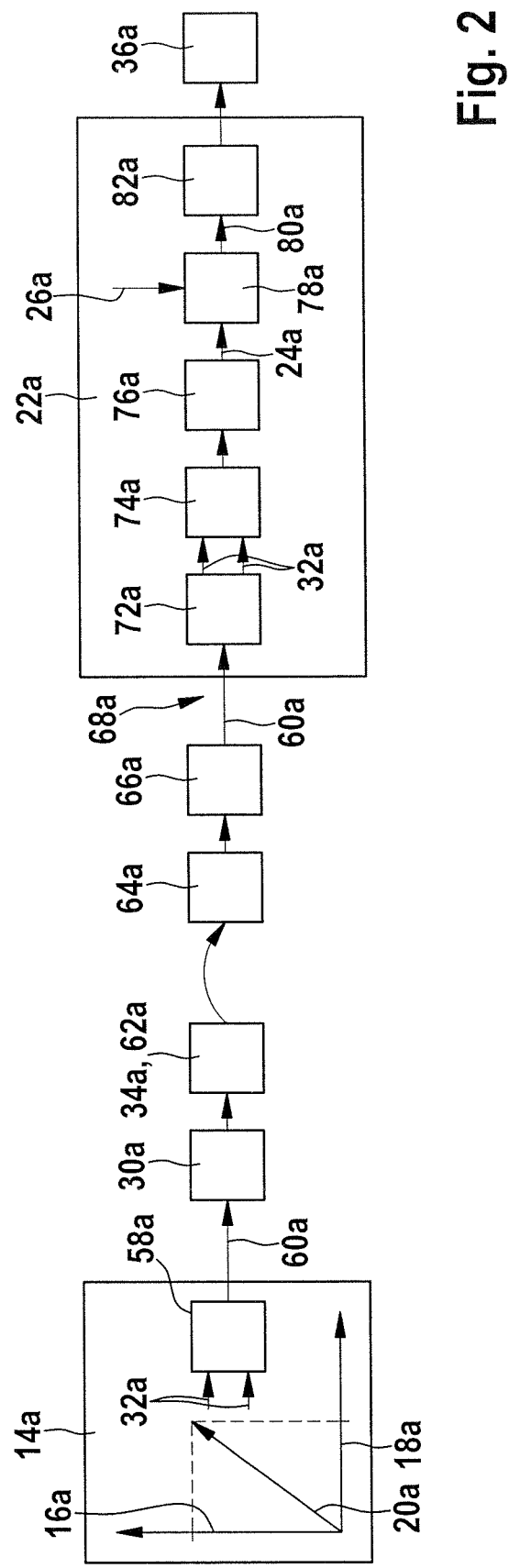
FIG. 2 schematically shows a path of communication between a sensor unit and a computation unit of the handheld power tool device of FIG. 1.

FIG. 2 schematically shows the communication and data processing from the sensor unit 14a to the drive motor 36a. The Hall sensors of the sensor unit 14a detect two different orientation parameters 16a, 18a, which describe an orientation of the handheld power tool 38a and which are embodied as two components of a vector of the Earth's magnetic field 20a. The orientation parameters 16a, 18a are oriented perpendicular to the axis of rotation 52a and perpendicular to one another. A communication means 58a of the sensor unit 14a digitizes the sensor parameters 32a output by the Hall sensors and outputs them as data 60a, coded by a transmission method that appears useful to one skilled in the art, to a transmission means 30a of the safety mechanism 12a.

The transmission means 30a is embodied as an amplifier. During an operation, it transmits the data 60a having the sensor parameters 32a in wireless fashion, by means of a coil 62a of the safety mechanism 12a that is disposed in the additional handle 28a, to a coil 64a of the safety mechanism 12a that is disposed in the housing 42a. This coil 64a is connected to a receiving means 66a, which is embodied as an amplifier with a filter. The receiving means 66a transmits the data 60a to a communication means 68a of the computation unit 22a. Communication between the sensor unit 14a and the computation unit 22a takes place in a simplex mode, but alternatively or in addition it could take place in a half-duplex or full-duplex mode.

The handheld power tool 38a has a main handle 70a. The main handle 70a is disposed on an end of the housing 42a that is remote from the tool insert fastener 40a, between the drive motor 36a and the battery interface 44a. The computation unit 22a is disposed in the main handle 70a of the handheld power tool 38a. The computation unit 22a has a processor, a memory with operating and calculation routines, and the communication means 68a for data input and data output. A first routine 72a decodes the coded data 60a and thus ascertains the sensor parameters 32a. From the sensor parameters 32a, a second routine 74a calculates an orientation of the handheld power tool 38a relative to the Earth's magnetic field 20a about the axis of rotation 52a. A third routine 76a of the computation unit 22a compares a calculated orientation with an earlier orientation, stored in memory, which was measured at the beginning of the work session, and thus compares it with an orientation parameter 16a, 18a measured at staggered times. To that end, the routine 76a uses a formula which appears useful to one skilled in the art and which, from orientation parameters 16a, 18a of two different vectors, determines an angle located between the vectors. A fourth routine 78a compares a resultant change in orientation 24a with a shutoff threshold value 26a and outputs a shutoff parameter 80a. A fifth routine 82a, which controls the drive motor 36a on the basis of a user input, evaluates the shutoff threshold value 80a and, in an uncontrolled blocking situation, switches off an energy supply to the drive motor 36a. Alternatively or in addition, the fifth routine 82a could open a coupling between the drive motor 36a and the tool insert fastener 40a and/or could mechanically block a drive train of the handheld power tool 38a, or in other words in particular the tool insert fastener 40a.

The safety mechanism 12a has an energy receiving means 34a, which is embodied in one piece with the coil 62a disposed in the additional handle 28a. The energy receiving means 34a is disposed on a side of the additional handle 28a that is connected to the housing 42a of the handheld power tool 38a. The energy receiving means 34a receives operating energy, transmitted in wireless fashion, which supplies the sensor unit 14a and the transmission means 30a. Alternatively or in addition, an energy storing means, not shown in detail, could supply the sensor unit 14a and the transmission means 30a. The operating energy is sent from the coil 64a disposed in the housing 42a. This coil 64a is supported with the additional handle fastener 54a rotatably, essentially about the axis of rotation 52a.

The safety mechanism 12a has a user output, not shown in detail, which informs a user of readiness for use of the safety mechanism 12a before a work procedure. If the safety mechanism 12a is not ready for use, for instance if a quantity of the orientation parameter 16a, 18a is too low because the vector of the Earth's magnetic field 20a oriented parallel to the axis of rotation 52a, or if the computation unit finds that the additional handle 28a is not connected to the housing 42a of the handheld power tool 38a, then the fifth routine 82a reduces a maximum torque of the drive motor 36a.

Figure 3:
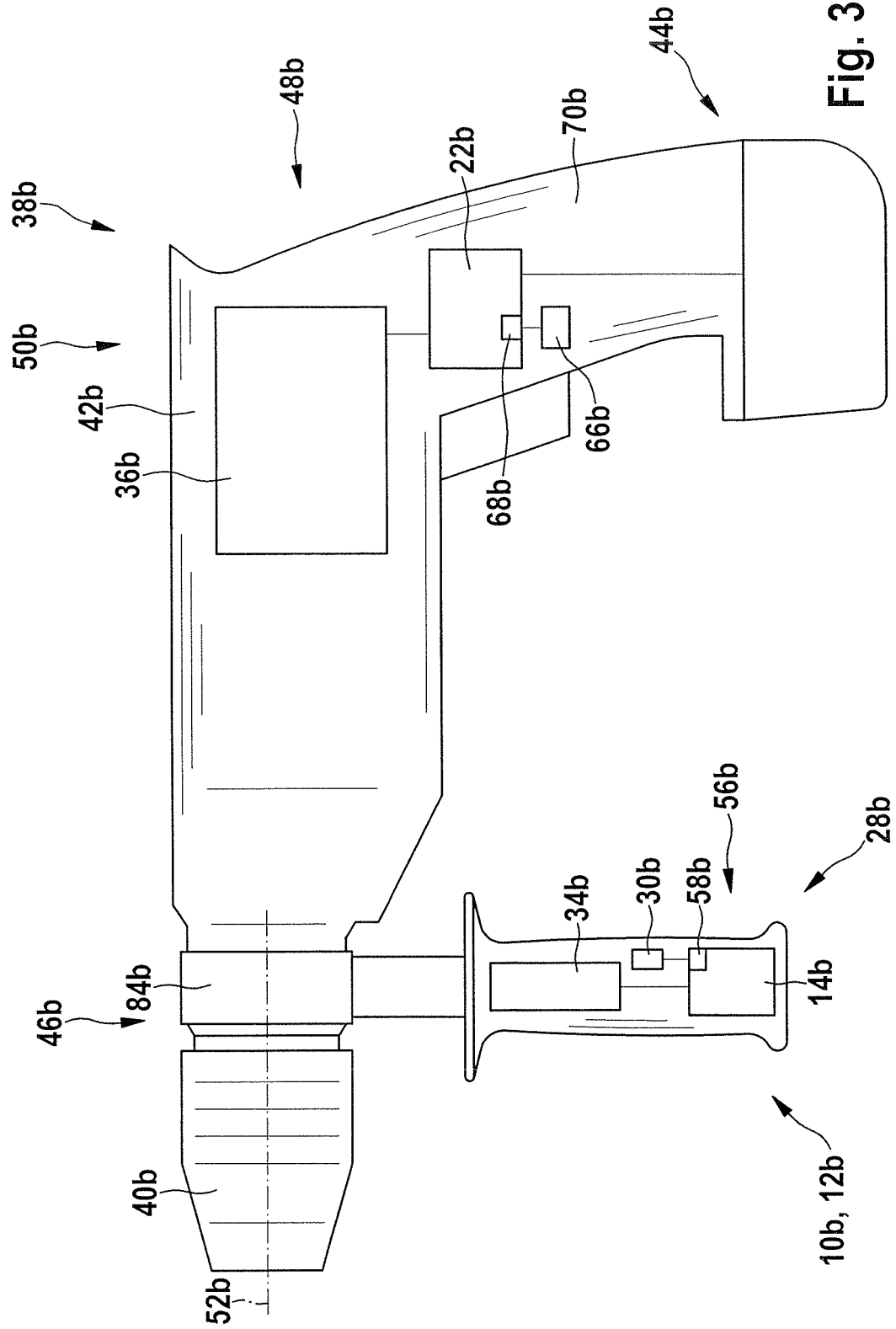
FIG. 3 schematically shows a further exemplary embodiment of the handheld power tool device of FIG. 1.

In FIG. 3, a further exemplary embodiment of the invention is shown. To distinguish between the exemplary embodiments, the letter a in the reference numerals for the exemplary embodiment of FIGS. 1 and 2 is replaced by the letter b in the reference numerals of the exemplary embodiment in FIG. 3. The ensuing descriptions are limited essentially to the differences between the exemplary embodiments; with regard to components, characteristics and functions that remain the same, reference can be made to the description of the other exemplary embodiments, especially in FIGS. 1 and 2.

FIG. 3 shows a handheld power tool 38b, with a handheld power tool device 10b that has a safety mechanism 12b and a sensor unit 14b. The safety mechanism 12b intervenes in an uncontrolled blocking situation. The sensor 14b, during an operation, detects two orientation parameters 16b, 18b directly (FIG. 2). The safety mechanism 12b has an energy receiving means 34b, which during an operation receives energy output in wireless fashion by a drive motor 36b of the handheld power tool 38b. An additional handle 28b is connected by means of a clamping ring 84b to a tubular region of the handheld power tool 38b. The handheld power tool device 10b has a transmission means 30b, which transmits coded data 60b by radio waves.

The sensor unit 14b has three Hall sensors, not identified by reference numeral. As a result, the sensor unit 14b can entirely determine a vector of the Earth's magnetic field 20b, and thus especially great safety can be attained, especially if a direction of the vector of the Earth's magnetic field 20b deviates only slightly from a direction of an axis of rotation 52b of a tool insert fastener 40b.

The foregoing relates to preferred exemplary embodiments of the invention, it being understood that other variants and embodiments thereof are possible within the spirit and scope of the invention, the latter being defined by the appended claims.

The invention claimed is:

1. A safety device for use in a handheld power tool having housing, a tool insert fastener for engaging a tool and a drive motor connected to a power supply within the housing and operably coupled to the tool insert fastener for rotating the tool about an axis of rotation extending longitudinally through the tool insert fastener, said device comprising:
   at least one safety mechanism configured to disconnect the drive motor from the power supply or to decouple the drive motor from the tool insert fastener to interrupt the rotation of the tool about the axis of rotation in an uncontrolled blocking situation in which the tool seizes in a workpiece causing the housing to rotate about the axis of rotation;
   a sensor unit associated with the housing and configured to generate data directly indicative of a rotational orientation of the housing relative to the axis of rotation; and
   a computation unit configured to compare said data generated by said sensor unit at staggered times and to activate the at least one safety mechanism in response to the comparison.

2. The safety device as defined by claim 1, wherein the data generated by said sensor unit, in at least one operating state, includes data indicative of the spatial orientation of the Earth's magnetic field relative to the axis of rotation.

3. The tool safety device as defined by claim 1, wherein the data generated by said sensor includes at least two different orientation parameters which describe the rotational orientation of the housing relative to the axis of rotation.

4. The safety device as defined by claim 2, wherein the data generated by said sensor includes at least two different orientation parameters which describe aft the rotational orientation of the housing relative to the axis of rotation.

5. The safety device as defined by claim 1, wherein the computation unit is operable to compare a difference in said data at different times comparing with a shutoff threshold value and to activate the at least one safety mechanism if the difference is outside said shutoff threshold value.

6. The safety device as defined by claim 2, wherein the computation unit is operable to compare a difference in said data at different times with a shutoff threshold value and to activate the at least one safety mechanism if the difference is outside said shutoff threshold value.

7. The safety device as defined by claim 3, wherein the computation unit is operable to compare a difference in said data at different times with a shutoff threshold value and to activate the at least one safety mechanism if the difference is outside said shutoff threshold value.

8. The safety device as defined by claim 4, wherein the computation unit is operable to compare a difference in said data at different times with a shutoff threshold value and to activate the at least one safety mechanism if the difference is outside said shutoff threshold value.

9. The safety device as defined by claim 1, wherein the sensor unit is spaced apart from components which essentially influence a detection of the Earth's magnetic field.

10. The safety device as defined by claim 8, wherein the sensor unit is spaced apart from components which essentially influence a detection of the Earth's magnetic field.

11. The safety device as defined by claim 1 in which the device includes a handle for holding the device with a trigger mechanism for controlling the drive motor, the device further comprising an additional handle in which the sensor unit is disposed.

12. The safety device as defined by claim 1, wherein the safety mechanism has a transmission device, which in at least one operating state transmits a sensor parameter in wireless fashion.

13. The safety device as defined by claim 1, wherein the safety mechanism has an energy receiving device, which is provided for receiving operating energy transmitted in wireless fashion.

14. The safety device as defined by claim 13, wherein the energy receiving device, in at least one operating state, receives energy output by a drive motor.

15. A handheld power tool having a safety device as defined by claim 1.

* * * * *